Feb. 8, 1966    E. S. CHALPIN    3,233,428
FLEXIBLE SHAFT COUPLING
Filed March 1, 1963

INVENTOR.
EDWARD S. CHALPIN
BY
*Blair & Buckles*
ATTORNEYS

United States Patent Office 3,233,428
Patented Feb. 8, 1966

3,233,428
FLEXIBLE SHAFT COUPLING
Edward S. Chalpin, Norwood, Mass., assignor to Metal Bellows Corporation, Wellesley, Mass.
Filed Mar. 1, 1963, Ser. No. 262,177
7 Claims. (Cl. 64—15)

The present invention relates to the flexible shaft coupling art. More particularly, it relates to a flexible shaft coupling utilizing an arrangement of metallic bellows to accommodate shaft misalignment and yet provide sufficient torsional rigidity to communicate rotational motion from the driving shaft to the driven shaft. Each individual bellows is positioned, and the remaining elements of the coupling are so constructed, as to prevent accidental breakage of the bellows.

Flexible shaft couplings utilizing a bellows arrangement have been known for some time. One type of coupling uses two separate metallic bellows interconnected by a cylindrical element. The outer ends of the two bellows are secured to the shafts to be coupled. By this arrangement, the ends of the coupling can be offset, and therefore the shafts being coupled need not be in exact alignment.

Flexible shaft couplings of this type have gained wide acceptance. The bellows impart a high degree of lateral flexibility to the coupling, thereby permitting the ends to be readily offset without producing significant lateral stresses on the shafts being coupled. Moreover, the full symmetry of the bellows around the axis of rotation provides a constant speed characteristic. In addition, the bellows elements in such devices may be constructed with sufficient torsional rigidity to prevent appreciable relative rotational displacement between the coupled shafts. Put another way, the rotational movement of the driving shaft is precisely communicated to the driven shaft, since there is no inherent slack or play in the coupling.

In the past, flexible shaft couplings incorporating metallic bellows have been prone to damage from being dropped or struck by falling objects. The bellows elements, being relatively fragile, are quite easily dented or fractured by even relatively light blows. Such damage often greatly degrades the operating characteristics of the coupling. The coupling must therefore be handled with care to prevent inadvertent damage to the bellows elements which would render the coupling unserviceable.

Accordingly, it is an object of the present invention to provide a bellows type flexible shaft coupling in which the bellows elements are protected against inadvertent damage.

An additional object is to provide a flexible shaft coupling wherein the constituent parts of the coupling cooperate in a novel manner to protect the bellows elements.

A further object is to provide an improved flexible shaft coupling of economical and simplified design.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which.

In general, the present invention provides a pair of bellows which are affixed to a pair of hubs for receiving and gripping the shafts to be coupled. An elongated cylindrical member interconnects the two bellows to complete the coupling assembly. The cylindrical member has a radial dimension which is at least equal to or greater than the largest radial dimension of the bellows. By this arrangement, the cylindrical member serves not only as an interconnector between the bellows elements but also as a guard or bumper to protect the bellows from inadvertent damage.

Figure 1:
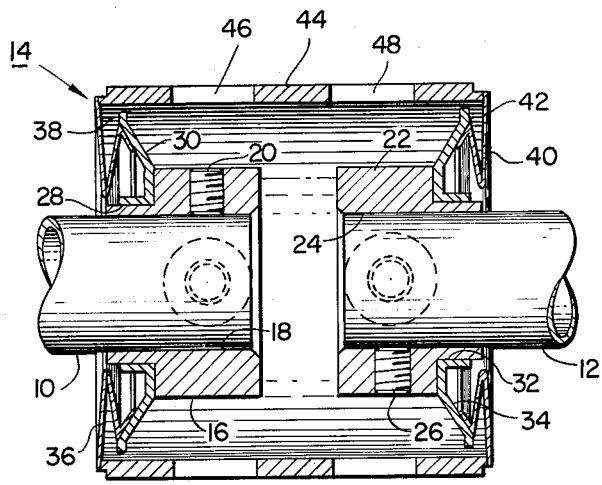
FIG. 1 is a cross sectional view of one embodiment of the invention.

As shown in FIG. 1, shafts 10 and 12 are coupled by a flexible shaft coupling 14 which communicates rotational movement of shaft 10 to shaft 12. A hub 16, having an axial bore 18, receives one end of the shaft 10 which is clamped in place by a set screw 20. Correspondingly, a set screw 26 clamps the shaft 12 in an axial bore 24 in the hub 22. Although only the two set screws 20 and 26 are shown, in practice it may be found necessary to employ a greater number. The hub 16 is recessed at 28 to accommodate an annular flange 30, while hub 22 is recessed at 32 to receive an annular flange 34. The flanges 30 and 34 are secured to the respective hubs in any suitable manner, such as by welding.

A bellows generally indicated at 36 has one end secured to the outer edge 38 of the flange 30, while a second bellows 40 is secured to the edge 42 of the flange 34. The other ends of the bellows 36 and 40 are secured to the opposite ends of a cylinder 44. While the bellows are shown to have only a single convolution it will be understood that, in practice, bellows having several convolutions may be employed. Welding (or brazing) is the preferred manner in which the bellows are secured in place. The cylinder 44 is of sufficient length and its internal diameter is such that the remaining elements of the coupling assembly may be disposed completely within it. The length of the cylinder 44 and the axial deflections of the bellows 36 and 40 determine the amount of parallel misalignment (lateral deflection) that can be tolerated between shaft 10 and shaft 12. Holes 46 and 48 in the cylinder 44 permit entry of a hand wrench for the purpose of turning the set screws 20 and 26.

Figure 2:
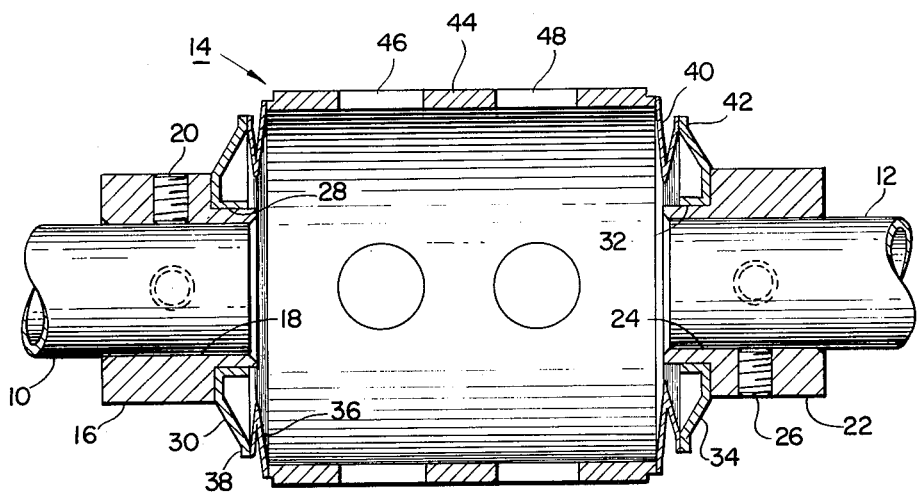
FIG. 2 is a cross sectional view of a second embodiment of the invention.

In FIG. 2 there is shown an additional embodiment of the invention in which identical parts as those shown in FIG. 1 are used, with the only difference being that the hubs 16 and 22 are turned around, end for end, and extend axially outwardly from the ends of the cylinder 44. Since the constituent parts of the coupling shown in FIG. 2 are identical to those disclosed in FIG. 1, corresponding reference numerals are used therein. Since the hubs 16 and 22 are turned around, the annular recesses 28 and 32 face inwardly in FIG. 2 rather than outwardly as seen in FIG. 1. Since the hubs are external of the cylinder 44, it is not necessary to provide apertures in the cylinder to permit entry of a hand wrench for manipulation of the set screws. In addition, in this embodiment, the bellows, flanges and hubs may have greater radial dimensions than in FIG. 1.

It will be appreciated that, with the bellows 36 and 40 disposed substantially within the cylinder 44, there is rather complete protection afforded for the bellows. Even if the coupling of FIG. 1 is dropped on its end, the blow will be absorbed without damage, since the bellows are quite flexible in the longitudinal direction. Even though the bellows shown in FIG. 2 are exposed beyond the ends of the cylinder 44, substantial protection is still afforded. The cylinder, along with the flanges 30 and 34 and hubs 16 and 22, are effective to absorb the impact of any accidental dropping of the coupling or similar accident, while completely protecting the bellows from damage. In this connection it will be noted that, in the embodiment of FIG. 2, unsupported portions of the bellows elements do not extend radially beyond the imaginary lines drawn from the ends 38 and 42 of the flange 30 and 34 to the respective ends of the cylinder 44. Accordingly, if the coupling is dropped, for example, most of the impact is absorbed by the flanges and the cylinder.

The fact that identical parts may be used in the two disclosed embodiment is a distinct advantage from a manufacturing standpoint. In this way the various parts may be fabricated without regard to the manner in which they will later be assembled to form the disclosed embodiments of the invention. Because of this flexibility, manufacturing costs are held to a minimum, since the tooling is identical for each embodiment.

Other embodiments than those specifically disclosed in FIGURES 1 and 2 are contemplated. For example, one hub may be mounted externally of the cylinder 44, as shown in FIGURE 2, while the other hub may be disposed inside the cylinder, as shown on FIGURE 1.

Obviously the hubs and their respective flanges may be machined as an integral unit. By this procedure the necessity to affix the flange to its respective hub by welding or brazing is obviated.

The invention thus provides a flexible shaft coupling in which the fragile metallic bellows elements are effectively protected from damage. This is accomplished in a simple and ingenious manner by providing an elongated cylinder of sufficient size to extend radially beyond the bellows affiixed thereto. By this arrangement, the cylinder effectively absorbs the impact of accidental blows, thereby preventing damage to the bellows.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A flexible shaft coupling for communicating rotational motion from a driving shaft to a driven shaft, said coupling comprising
    (a) a first bellows supporting means including a first axially extending hub for securing to said driving shaft,
    (b) a second bellows supporting means including a second axially extending hub for securing to said driven shaft,
    (c) a first bellows secured to said first bellows supporting means,
    (d) a second bellows secured to said second bellows supporting means,
    (e) tubular member having an axis of rotation,
    (f) said first and second bellows being secured to said tubular member and extending axially outwardly therefrom,
    (g) said tubular member having a radial dimension which is at least as great as the largest radial dimension of said first and second bellows,
    (h) the ends of said tubular member and the outer ends of the axially extending surfaces of said hubs defining imaginary straight lines therebetween all around the perimeter of said coupling, and
    (i) the diameter of said first and second bellows being such that said bellows do not extend radially out beyond said imaginary lines.

2. The coupling claimed in claim 1, wherein said first and second hubs extend axially out from the ends of said tubular member.

3. A flexible shaft coupling for communicating rotational motion from a driving shaft to a driven shaft, said coupling comprising:
    (a) a first hub for securing to said driving shaft,
    (b) a first radially extending flange affixed to said first hub,
    (c) a second hub for securing to said driven shaft,
    (d) a second radially extending flange affixed to said second hub,
    (e) a first bellows secured to said first flange,
    (f) a second bellows secured to said second flange,
    (g) an elongated tubular member having opposite ends spaced apart along an axis of rotation,
    (h) said first and second bellows being secured to said opposite ends of said tubular member and extending axially outwardly therefrom,
    (i) the outer ends of said flanges and the corresponding ends of said tubular member defining imaginary straight lines therebetween all around the perimeter of said coupling, and
    (j) said tubular member and said flanges having radial dimensions large enough so that said bellows do not extend out beyond said imaginary lines.

4. A flexible shaft coupling for communicating torque from a driving shaft to a driven shaft, said coupling comprising:
    (a) a first bellows supporting means for securing said coupling to said driving shaft,
    (b) a second bellows supporting means for securing said coupling to said driven shaft,
    (c) a first bellows secured to said first means,
    (d) a second bellows secured to said second means,
    (e) a tubular member having opposite ends spaced apart along an axis of rotation,
    (f) said first and second bellows being secured to said tubular member and extending out the opposite ends thereof,
    (g) the outermost parts of said bellows supporting means and the corresponding ends of said tubular member defining imaginary straight lines therebetween all around the perimeter of said coupling, and
    (h) at least one of said tubular members and said bellows supporting means having a radial dimension sufficiently larger than the radius of said bellows that said bellows do not extend out beyond said imaginary lines.

5. The coupling defined in claim 4, wherein
    (a) said first bellows has a first circular end periphery secured to the radially larger of said first bellows supporting means and said tubular member and a second circular end periphery of lesser diameter than said first periphery and secured to the other of said first bellows supporting means and said tubular member, and
    (b) said second bellows has a third circular end periphery secured to the radially larger of said second bellows supporting means and said tubular member and a fourth circular end periphery of lesser diameter than said third periphery and secured to the other of said second bellows supporting means and said tubular member.

6. A flexible shaft coupling for communicating rotational motion from a driving shaft to a driven shaft, said coupling comprising a first hub for securing to said driving shaft, a first radially extending flange affixed to said first hub, a second hub for securing to said driven shaft, a second radially extending flange affixed to said second hub, a first bellows having one end secured to said first flange, a second bellows having one end secured to said second flange, an elongated tubular member having opposite ends spaced apart along an axis of rotation, the other ends of said bellows being secured to the opposite ends of said member selectively in one of two positions and wherein in said first position said first and second flanges are disposed within said tubular member, and wherein in said second position said first and second flanges are disposed without said tubular member, the outer ends of said flanges and the corresponding ends of said tubular members defining imaginary straight lines therebetween all around the perimeter of said coupling, the radial dimension of said bellows being such that said bellows do not extend out beyond said imaginary lines.

7. A flexible shaft coupling for communicating torque from a driving shaft to a driven shaft, said coupling comprising a first hub for securing to said driving shaft, a first radially extending flange affixed to said first hub, a second hub for securing to said driven shaft, a second radially extending flange affixed to said second hub, a first bellows secured to said first flange, a second bellows secured to said second flange, an elongated tubular member having opposite ends, means for securing said first and second bellows to said tubular member so that they extend axially out from said ends of said member, the outer ends of said flanges and the corresponding ends of said tubular member defining imaginary straight lines therebetween all around said coupling, said tubular member having a radial dimension large enough so that said first and second bellows do not extend out beyond said imaginary lines.

References Cited by the Examiner

UNITED STATES PATENTS

| | | | |
|---|---|---|---|
| 1,283,787 | 11/1918 | Jencick | 64—13 |
| 1,471,143 | 10/1923 | Cromwell | 64—15 |
| 1,752,106 | 3/1930 | Persons | 64—13 |
| 2,251,804 | 8/1941 | Reuter et al. | 64—11 |
| 2,997,863 | 8/1961 | Stone et al. | 64—13 |

FOREIGN PATENTS 75,332  1/1919  Austria.

BROUGHTON G. DURHAM, *Primary Examiner.*

CARL W. TOMLIN, ROBERT C. RIORDON,
*Examiners.*